United States Patent [19]

Okamoto

[11] 4,361,856
[45] Nov. 30, 1982

[54] VIDEO TAPE RECORDER

[75] Inventor: Hiroshi Okamoto, Yao, Japan

[73] Assignee: Matsushita Electric Industrial Co., Ltd., Osaka, Japan

[21] Appl. No.: 213,730

[22] Filed: Dec. 5, 1980

[30] Foreign Application Priority Data

Dec. 11, 1979 [JP] Japan .................................. 54-161127

[51] Int. Cl.³ .............................................. G11B 15/44
[52] U.S. Cl. ...................................................... 360/64
[58] Field of Search .................................... 360/64, 33

[56] References Cited

U.S. PATENT DOCUMENTS 3,580,992 5/1971 Eguchi et al. ....................... 360/64

Primary Examiner—Vincent P. Canney
Attorney, Agent, or Firm—Wenderoth, Lind & Ponack

[57] ABSTRACT

A video tape recorder of the helical scan type including two rotational video heads which have their phase and speed controlled. The video heads are mechanically displaced by 180° from each other and reproduce the video signal on the magnetic tape. The position of one of the video heads is indicated by PG pulse from a first pulse generator. A second pulse generator provides 2N pulses per revolution of the video heads, where N is an integer. A first divider is reset by the PG pulse, and divides by N the output pulse frequency of the second pulse generator, and adjusts the output phase of the first divider whose phase corresponds to the phase of the video heads. The second divider is also reset by each PG pulse and divides the output pulse frequency of the first divider by 2. Video signals reproduced by the video heads are chosen in accordance with the level of the output pulse from the second divider.

3 Claims, 18 Drawing Figures

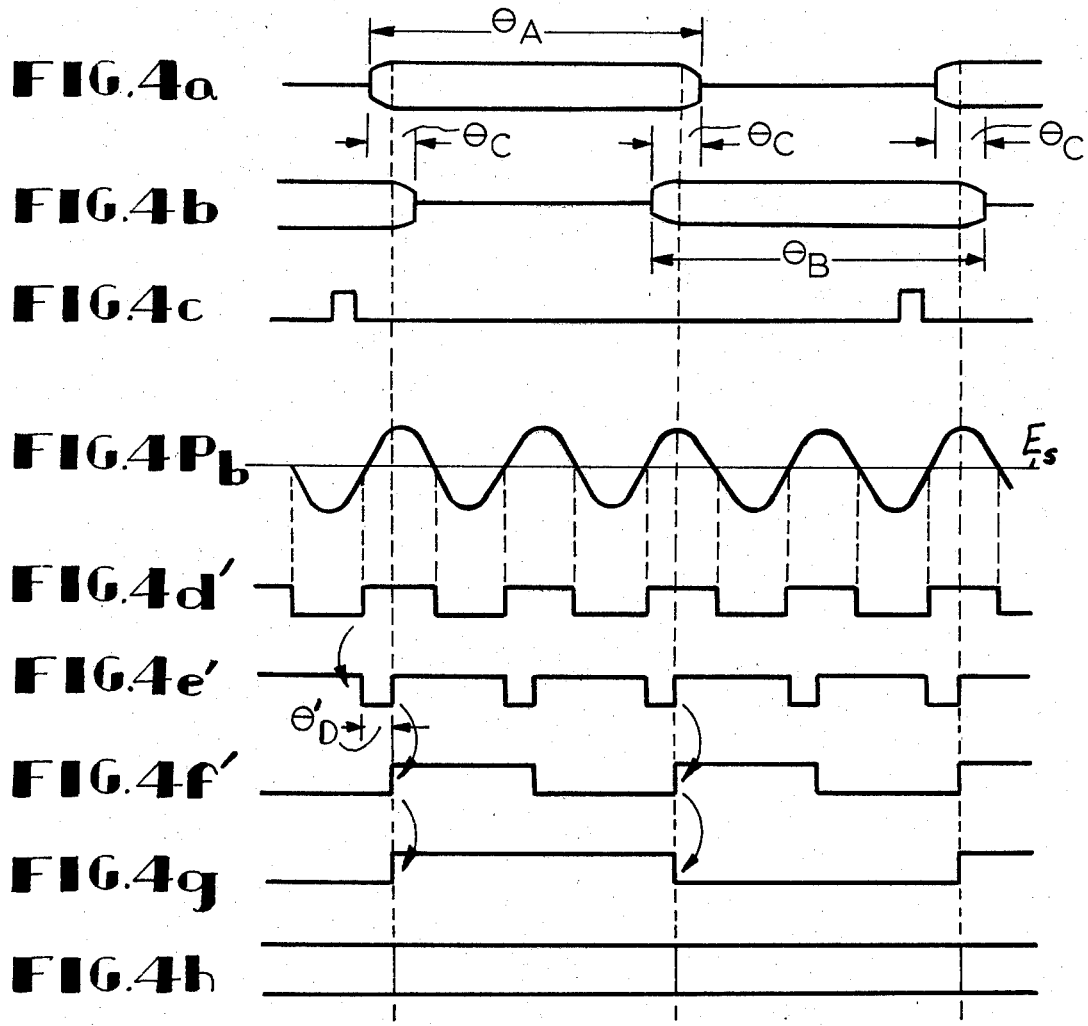

VIDEO TAPE RECORDER

BACKGROUND OF THE INVENTION

This invention relates to a video tape recorder and more particularly to a video tape recorder of the helical scan type which reproduces the video signal on the magnetic tape by means of two rotational video heads which are mechanically displaced by 180° from each other.

Conventionally, in a video tape recorder of the helical scan type, during recording, the speed and phase of the video heads are controlled to record certain portions of video signals at a particular position on the magnetic tape, and the longitudinal speed and position of the magnetic tape are also controlled. A recorded video track is oblique to the longitudinal direction of the tape. Every video track includes information corresponding to more than one field of video signals, so as to prevent drop out of reproduced signal at playback.

During playback, the speed and phase of the video heads are controlled, and the speed and position of the tape are controlled to well track the video tracks on the tape. Consequently, each video head alternately tracks the adjacent video tracks on the tape, and video signals reproduced by each video head include more than one field signal. That is, during a certain angle of head revolution, the same video signal is reproduced by both video heads. Then, the video signal reproduced by each head is chosen by head switching means every 180° of the head rotational angle.

In prior art systems, there are two types of video tape recorders, each having a different method of choosing the video signal reproduced by the two video heads every 180° of the head rotation. One of these is a two sensor type and the other is a single sensor type. In the two sensor type, a permanent magnet segment which is rotated with the video heads, is arranged at the position corresponding to one of the video heads. Two sensors for sensing the magnetic flux variation of the magnet segment are mechanically displaced at predecided positions by about 180°. Output signal waveforms of the sensors are individually shaped by shapers. The phases of the shapers output signals are respectively adjusted by monostable multivibrators to eliminate mechanical errors which occur upon assembling the magnet segment and the sensors. An R-S flip-flop is set by the output signal from one of the monostable multivibrators, and reset by the output signal from the other monostable multivibrator. The video signal reproduced by each video head is chosen in accordance with the output level of the R-S flip-flop.

In the single sensor type, two magnet segments, which are rotated with the video heads, are respectively arranged in positions corresponding to the positions of the video heads. The surface magnetic polarities of the magnet segments are different from each other. The sensor for sensing the polarity of each of the magnet segments, is placed at a predecided position. The output signal from the sensor is supplied to a polarity discriminator which discriminates the polarity sensed by the sensor. The discriminator generates two pulse trains corresponding to the polarities N and S. The two output pulse trains correspond to respective magnet segment positions. The phases of the output signals from the discriminator are respectively adjusted by the monostable multivibrators to eliminate the mechanical errors which occur upon assembling the sensor and magnet segments. An R-S flip-flop is set by the output signal of one of the monostable multivibrators and reset by the output signal of the other monostable multivibrator. The video signal reproduced by each video head is chosen in accordance with the output signal level of the R-S flip-flop in the same manner as in the two sensor type.

A significant disadvantage of the conventional video tape recorders mentioned above, either the single or two sensor type, is a requirement of individually adjusting the phases of the output signals from the shapers or the discriminator by means of two monostable multivibrators to obtain the signal for choosing the video signal reproduced by the video heads.

OBJECT OF THE INVENTION

An object of the present invention is to provide a video tape recorder to obtain a signal for alternately choosing video signals reproduced by two video heads every 180° by means of one phase shifter.

It is another object of this invention to provide a video tape recorder which can obtain a signal for alternately choosing the video signals reproduced by two video heads, and which is further mechanically simple and inexpensive to manufacture.

SUMMARY OF THE INVENTION

In accordance with the present invention, a video tape recorder which is played back by alternately choosing video signals reproduced by two video heads every 180° of the head rotation angle is provided. A first pulse generator generates a PG pulse which indicates the phase corresponding to the phase of one of the video heads. A second pulse generator is provided for generating 2N pulses per revolution of the video heads, where N is an integer. A first divider divides the output pulse frequency of the second pulse generator by N, and shifts the output signal phase. It is then reset by the PG pulse. As a result, the first divider generates two pulses per head revolution, whose phases have a predecided phase difference from respective video heads. The second divider is reset by the PG pulse and divides the output pulse frequency of the first divider by 2. The video signals reproduced by the video head are alternately chosen every 180° of the head rotational angle by means of head switching means controlled by the output signal of the second divider.

BRIEF DESCRIPTION OF THE DRAWINGS

These and other objects and features of the present invention will become apparent from consideration of the following detailed descriptions of the invention taken together with the accompanying drawings, in which:

FIGS. 4a–4h comprise a waveform chart of important parts in FIG. 3.

DETAILED DESCRIPTION OF A PREFERRED EMBODIMENT

Figure 1:
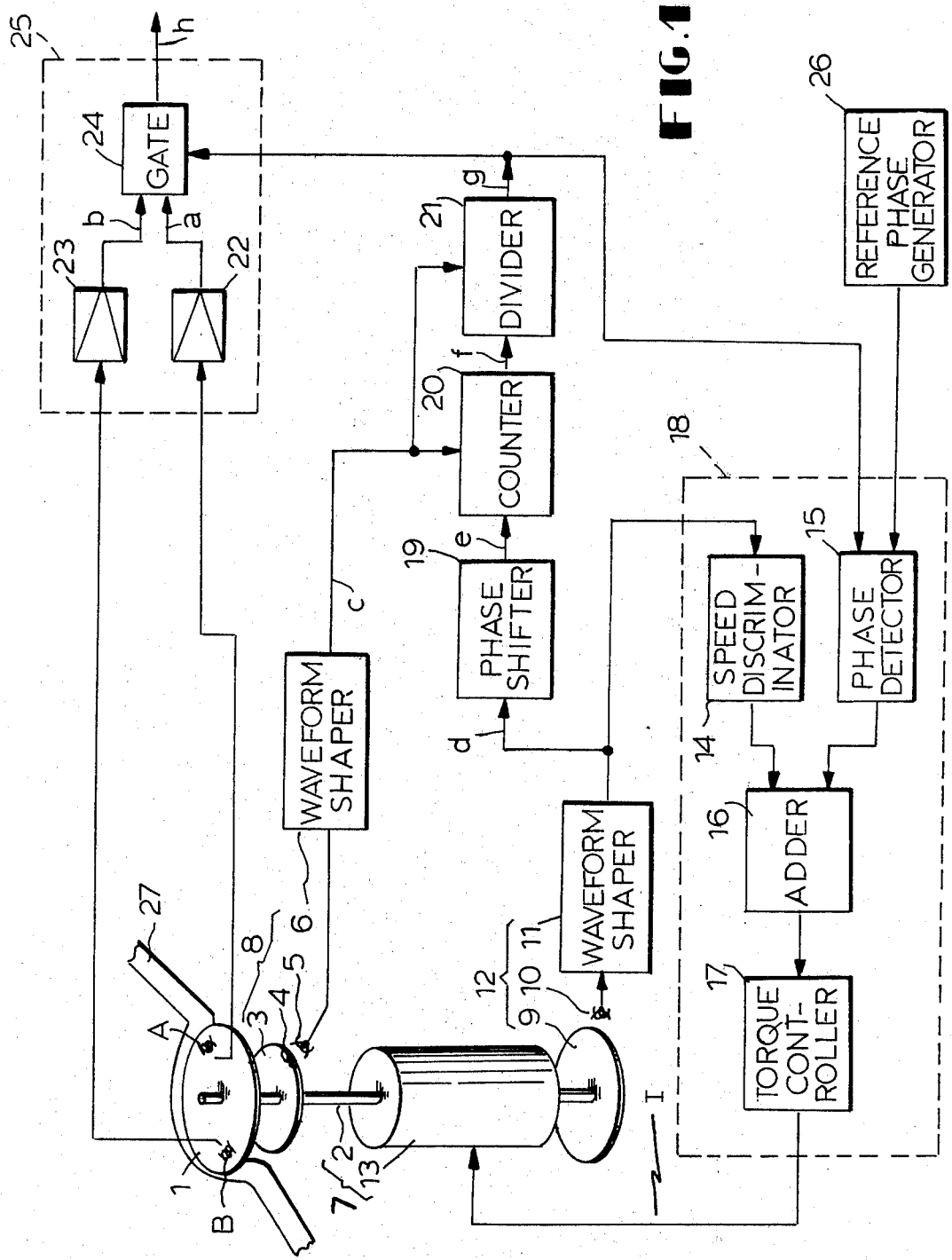
FIG. 1 is a basic block diagram of a preferred embodiment of the invention.

FIG. 1 is a basic block diagram of a preferred embodiment of the invention. FIGS. 2a–2h comprise a waveform chart to explain the invention shown in FIG. 1, where the waveforms of FIGS. 2a–2h respectively represent signals appearing at points (a) to (h) of FIG. 1.

Video heads A and B are displaced by 180° from each other on a rotor disk 1. Driving means 7 is comprised of a DC motor 13 and a rotor shaft 2. First pulse generator means 8 is comprised of a rotor disk 3 having a magnet segment 4, a pick-up coil 5 for sensing the variation of the flux from the magnet segment 4, and a waveform shaper 6 to shape the signal from the pick-up coil 5.

Second pulse generator means 12 is comprised of a rotor disk 9 having 2N (N=4, for this embodiment) magnetic poles, denoted by N and S, diametrically arranged at a same pitch on the periphery of the rotor disk 9, a pick-up coil 10, and a waveform shaper 11 for shaping the waveform of output signals from the pick-up coil 10. Rotor disks 1, 3, 9 are driven by the DC motor 13 through the rotor shaft 2. The output of the waveform shaper 11 is supplied to a phase shifter 19 comprising a monostable multivibrator. Counter 20 divides by N the frequency of the output signal from the phase shifter 19, and is reset by the output signal of the waveform shaper 6. Phase shifter 19 and counter 20 constitute a first divider means.

Second divider 21 divides the frequency of the output signal from the counter 20 by 2 and is reset by the output signal the waveform shaper 6. Head switching means 25 comprises video amplifiers 22, 23 which individually amplify the video signals reproduced by the video heads A and B, and a gate 24 for choosing the video signal amplified by the video amplifiers 22, 23 corresponding to the signal from the second divider 21. The phase of the output pulse from the second divider 21 is compared with the phase of a reference phase pulse from a reference phase generator 26, by a phase detector 15 which provides an output voltage corresponding to the phase difference. Speed discriminator 14 provides an output voltage corresponding to the frequency of the output signal from waveform shaper 11. The output voltage of the speed discriminator can be called a speed signal. Output voltages from the phase detector 15 and speed discriminator 14 are mixed by an adder 16. Torque controller 17 generates an armature current I in accordance with the output voltage from the adder 16. Video heads A and B are rotated with a constant phase difference with respect to the reference phase being kept. Speed discriminator 14, phase detector 15, adder 16 and torque controller 17 constitute a phase controller means 18. Consequently, video heads alternately track the video tracks on the tape 27 during playback.

Figure 2:
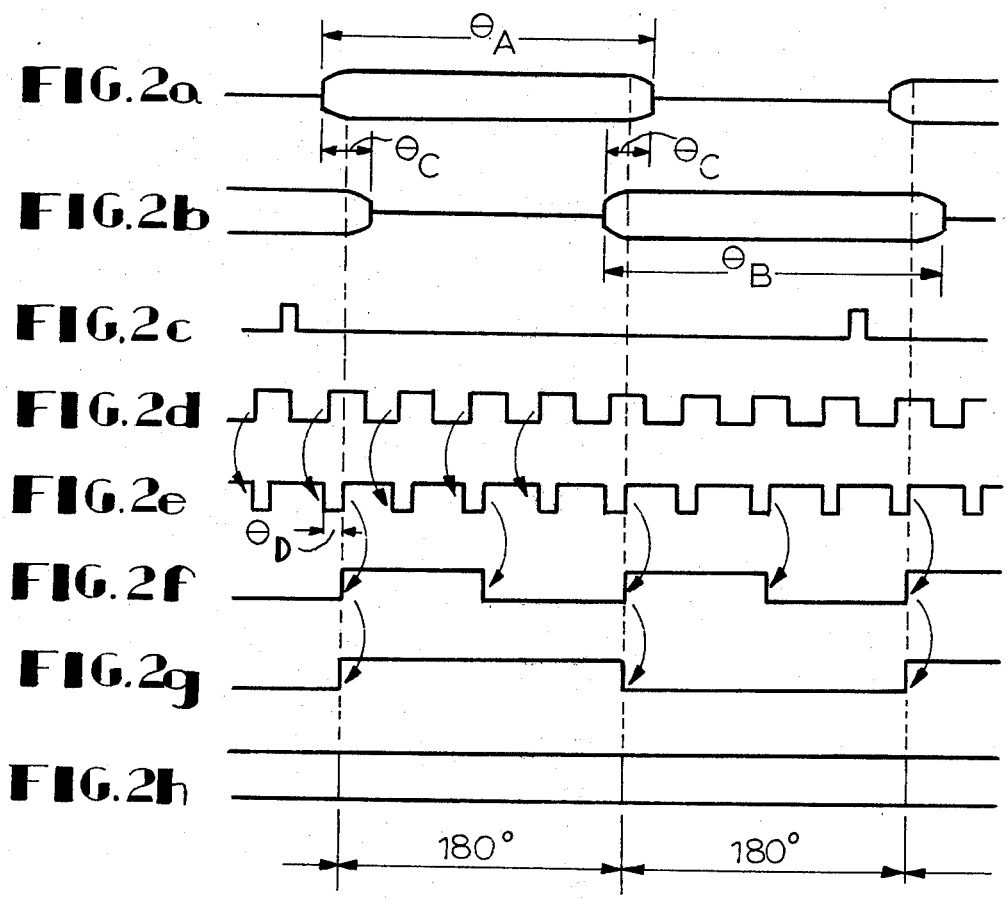
FIGS. 2a–2h comprise a waveform chart of important parts in FIG. 1.

A video signal reproduced by video heads A, B is amplified by the first and second head amplifier 22 and 23, respectively. First head amplifier 22 provides the signal (a), and second head amplifier 23 provides the signal (b). Signal (a) includes the information of the video signal during a $\theta_A$ angle every 360 degrees of rotation of rotor disk 1. In the same way, signal (b) includes the information of video signal during $\theta_B$ as shown in FIG. 2. $\theta_A$ and $\theta_B$ are more than 180 degrees. That is, as shown in FIG. 2 during $\theta_C$, video amplifiers 22 and 23 provide information of video signals at the same time. First pulse generator means 7 provides the signal (c) as a PG pulse. Second pulse generator means 12 provides the signal (d). Signal (d) is supplied to the pulse shifter 19, and the phase of leading edge of signal (d) is delayed by $\theta_D$. Counter 20 divides signal (e) from pulse shifter 19 by 4 in accordance with the leading edge of signal (e), and is reset by signal (c). By adjusting $\theta_D$ by the pulse shifter 19, the leading edge of the signal (f) can be made to correspond to about the center phase of $\theta_C$. The second divider 21 is changed in its output state by every leading edge of signal (f), and is reset by signal (c). Second divider 21 provides the signal (g). Gate 24 receives the signals (a), (b), and provides the signal (a) in a period of high level of signal (g) and the signal (b) in a period of the low level of signal (g), alternately. That is, the head switching means 25 provide the reproduced video signal (h) without the overlapping period $\theta_C$.

Figure 3:
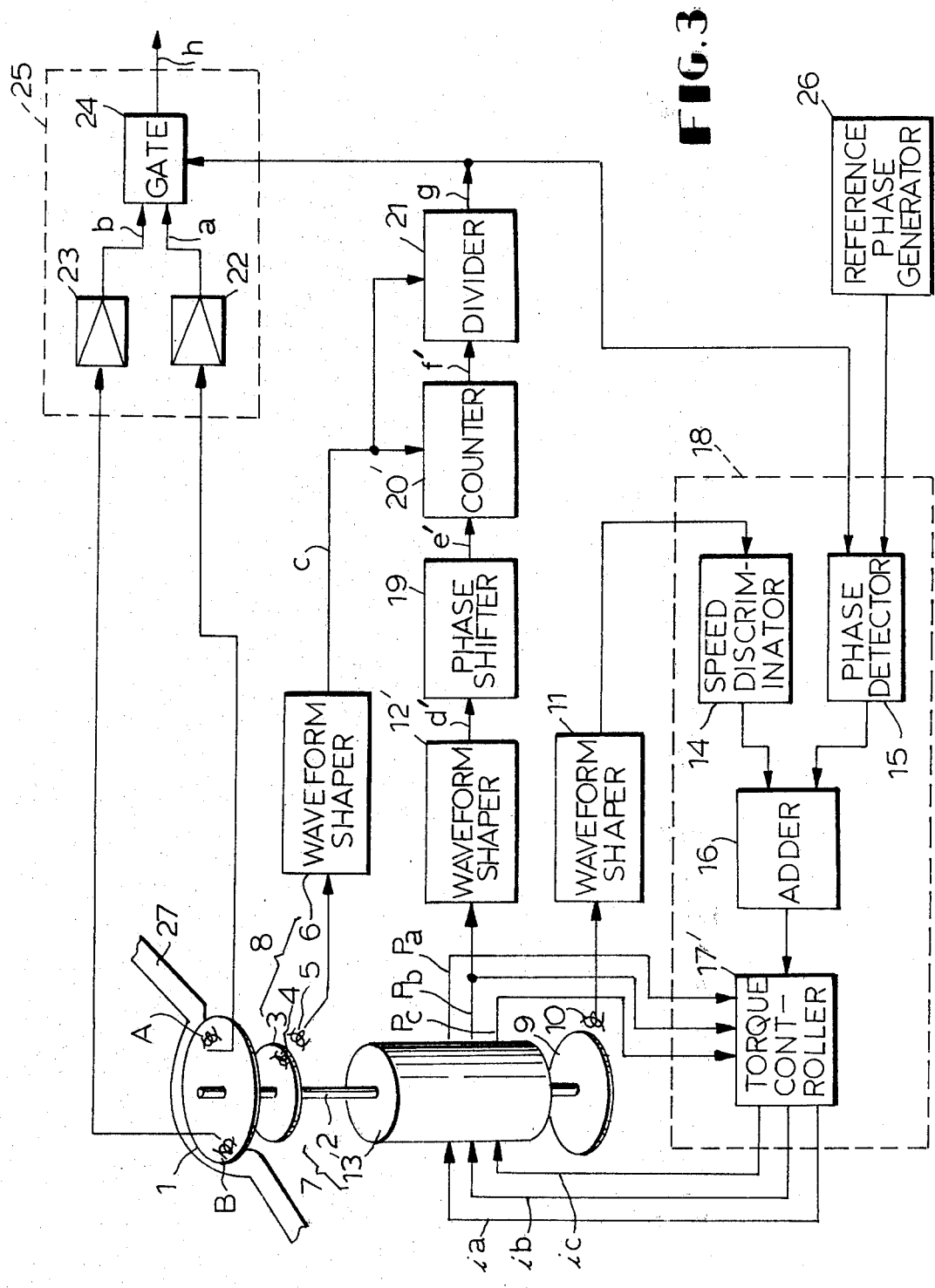
FIG. 3 is a basic block diagram of another embodiment of the invention.

Next, another embodiment of the present invention is explained refering to FIG. 3 and FIGS. 4a–4h. In FIG. 3 and 4a–4h, elements having same functions and same signal waveforms as those in FIG. 1 and 2 are marked with same reference numerals and symbols. Elements having similar functions and similar waveforms in FIGS. 3 and 4a–4h to those in FIGS. 1 and 2 are marked with the same reference symbols with a prime. As with FIGS. 2a–2h, the waveforms of FIGS. 4a–4h respectively represent the signals appearing at corresponding points of FIG. 3, i.e. FIG. 4a illustrates the waveform at point a of FIG. 3, etc. In FIG. 3, driving means 7 is comprised of a 3 phase brushless DC motor 13' providing 3 phase position signals $P_a$, $P_b$, $P_c$. In this case, each of the signals $P_a$, $P_b$, $P_c$ has a sinusoidal waveform having four cycles per rotation of the video heads. In this case, pick-up coil 10 only senses the speed of the video heads. Waveform shaper 12' is the second pulse generator means. Counter 20' divides its input pulse frequency by an 2 and is reset by output pulse of waveform shaper 6. Torque controller 17' receives the position signals $P_a$, $P_b$, $P_c$, and supplies currents $i_a$, $i_b$, $i_c$ to the 3 phase brushless DC motor 13' corresponding to an output voltage from adder 16, and commutates the currents $i_a$, $i_b$, $i_c$ by means $P_a$, $P_b$, $P_c$.

The functions of other elements in FIG. 3 are the same as those in the first case mentioned above. That is, reproduced video signals (a) and (b) are amplified by video amplifiers 22 and 23 respectively and are supplied to the gate 24. Signal (c) is a PG pulse from the first pulse generator means 8 and is supplied to counter 20' and second divider 21 to reset them. Position signal $P_b$ is supplied to waveform shaper 12', and shaped in its waveform at a threshold voltage $E_s$. The phase of the leading edge of signal (d') is delayed by $\theta'_d$ by phase shifter 19. Counter 20' is changed in its output state by the leading edge of signal (e') and provides the signal (f'). By adjusting $\theta'_d$ by phase shifter 19, the leading edge of signal (f') can be made to correspond to about center phase of $\theta_c$. The leading edge of signal (f') changes the output state of second counter 21. Choosing the signal (a) and (b) by means of the gate 24 controlled by the signal (g), thereby provides a video signal (h) without an overlapping period $\theta_c$.

While in FIG. 1 or 3, the phase shifter 19 is arranged before the counter 20 or 20', it is possible to arrange the phase shifter after the counter 20 or 20'.

As described hereinbefore, the present invention provides a video tape recorder having a signal for choosing, means of one phase shifter, the video signal reproduced by two video heads.

What is claimed is:

1. A video tape recorder comprising two video heads which are mechanically displaced by 180° for reproducing recorded video signals on a magnetic tape, comprising:

a first pulse generator means for providing a PG pulse for indicating the position of one of said video heads;
a second pulse generator means for providing 2 N pulses per revolution of said video heads, wherein N is an integer;
a driving means for driving said video heads;
a phase controller means for controlling the phase of said video heads in accordance with a reference phase signal;
a first divider means, reset by said PG pulse, for dividing an output frequency from said second pulse generator means by N and for generating output pulses having phases corresponding to the phases of said video heads;
a second divider means for dividing an output frequency of said first divider means by 2; and
a head switching means for choosing reproduced video signals by said video heads according to an output of said second divider means, and for sequentially outputting the chosen video signals.

2. A video tape recorder according to claim 1, wherein said phase controller means comprises:
a phase detector means for detecting the phase of one of said video heads with respect to said reference phase signal;
a speed discriminator for providing a speed signal according to an output signal of said second pulse generator means;
an adder means for mixing the output signal of said phase detector means and an output signal of said speed discriminator; and
a torque controller means for adjusting, according to an output signal of said adder means, the rotational torque for rotating said video heads.

3. A video tape recorder according to claim 1, wherein said driving means is a brushless DC motor which generates position signals to commutate its armature currents, said 2 N pulses being generated from these position signals by said second pulse generator means.

* * * * *